(12) United States Patent
Yu et al.

(10) Patent No.: US 11,463,293 B2
(45) Date of Patent: *Oct. 4, 2022

(54) OFDM TRANSMISSION METHOD AND DEVICE IN WIRELESS LAN SYSTEM

(71) Applicant: ELECTRONICS AND TELECOMMUNICATIONS RESEARCH INSTITUTE, Daejeon (KR)

(72) Inventors: Hee Jung Yu, Daejeon (KR); Min Ho Cheong, Daejeon (KR); Jae Seung Lee, Daejeon (KR); Hyoung Jin Kwon, Daejeon (KR); Sok Kyu Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,962

(22) Filed: Sep. 16, 2020

(65) Prior Publication Data

US 2020/0412593 A1 Dec. 31, 2020

Related U.S. Application Data

(63) Continuation of application No. 15/874,827, filed on Jan. 18, 2018, now Pat. No. 10,812,309, which is a (Continued)

(30) Foreign Application Priority Data

Jun. 19, 2012 (KR) .................. 10-2012-0065520
Jun. 18, 2013 (KR) .................. 10-2013-0069404

(51) Int. Cl.
*H04L 27/26* (2006.01)
*H04W 52/02* (2009.01)
(Continued)

(52) U.S. Cl.
CPC .......... *H04L 27/2637* (2013.01); *H04B 7/12* (2013.01); *H04L 1/004* (2013.01); *H04L 1/08* (2013.01);
(Continued)

(58) Field of Classification Search
None
See application file for complete search history.

(56) References Cited

U.S. PATENT DOCUMENTS 8,891,664 B2   11/2014 Kogawa et al.
9,264,274 B2 *  2/2016 Yu ....................... H04L 27/2627
(Continued)

FOREIGN PATENT DOCUMENTS

CN   1984110 A   6/2007
CN   1992701 A   7/2007
(Continued)

OTHER PUBLICATIONS

Minyung Park, Proposed Specification Framework for TGah, pp. 1-13, Mar. 12 (Year: 2012).*
(Continued)

*Primary Examiner* — Christopher M Crutchfield

(57) ABSTRACT

An apparatus and method for orthogonal frequency division multiplexing (OFDM) transmission in a wireless local area network (WLAN) system is disclosed, in which the apparatus for OFDM transmission in the WLAN system includes a signal repetition unit to repeat an encoded signal based on a block unit and output the encoded signal and a repeated signal, an interleaver to interleave the encoded signal and the repeated signal and output an interleaved signal, a modulator
(Continued)

to modulate the interleaved signal and output modulated symbols, and a phase rotation unit to phase shift the modulated symbol.

8 Claims, 8 Drawing Sheets

Related U.S. Application Data continuation of application No. 15/017,035, filed on Feb. 5, 2016, now Pat. No. 9,912,509, which is a continuation of application No. 14/408,933, filed as application No. PCT/KR2013/005376 on Jun. 19, 2013, now Pat. No. 9,264,274.

(51) Int. Cl.
    H04L 1/00      (2006.01)
    H04L 1/08      (2006.01)
    H04L 5/00      (2006.01)
    H04B 7/12      (2006.01)
    H04W 72/04     (2009.01)
    H04W 84/12     (2009.01)

(52) U.S. Cl.
    CPC ............ *H04L 5/001* (2013.01); *H04L 5/0007* (2013.01); *H04L 5/0044* (2013.01); *H04L 5/0053* (2013.01); *H04L 27/2617* (2013.01); *H04L 27/2621* (2013.01); *H04L 27/2627* (2013.01); *H04W 52/0209* (2013.01); *H04W 72/0453* (2013.01); *H04W 84/12* (2013.01); *Y02D 30/70* (2020.08)

(56) References Cited

U.S. PATENT DOCUMENTS

| | | | |
|---|---|---|---|
| 9,912,509 B2 * | 3/2018 | Yu | H04W 52/0209 |
| 10,812,309 B2 * | 10/2020 | Yu | H04L 27/2617 |
| 2007/0296616 A1 | 12/2007 | Lim et al. | |
| 2011/0051747 A1 * | 3/2011 | Schmidl | H04L 27/2634 |
| | | | 370/474 |
| 2011/0194544 A1 | 8/2011 | Yang et al. | |
| 2011/0243269 A1 | 10/2011 | Kogawa et al. | |
| 2012/0039198 A1 * | 2/2012 | Yang | H04L 27/2615 |
| | | | 370/252 |
| 2012/0201316 A1 * | 8/2012 | Zhang | H04L 1/0065 |
| | | | 375/260 |
| 2012/0327871 A1 * | 12/2012 | Ghosh | H04L 5/0023 |
| | | | 370/329 |

FOREIGN PATENT DOCUMENTS

| | | |
|---|---|---|
| CN | 101098324 A | 1/2008 |
| CN | 101461207 A | 6/2009 |
| CN | 101515809 A | 8/2009 |
| CN | 101635980 A | 1/2010 |
| CN | 101641924 A | 2/2010 |
| CN | 101795152 A | 8/2010 |
| CN | 101796791 A | 8/2010 |
| CN | 101848184 A | 9/2010 |
| CN | 101945077 A | 1/2011 |
| CN | 102017618 A | 4/2011 |
| JP | 2009290728 A | 12/2009 |
| WO | WO2011084356 A1 | 7/2011 |

OTHER PUBLICATIONS

M. Park, Proposed Specification Framework for TGah, pp. 1-36, Sep. 9 (Year: 2012).*

A. Ghassemi, et al., "Low-Complexity Distortionless Techniques for Peak Power Reduction in OFDM Communication Systems", UVicSPACE: Research & Learning Repository, University of Victoria, Jun. 2012.

International Search Report for PCT/KR2013/005376 dated Oct. 16, 2013.

Heejung Yu, "Repetition Schemes for TGAH," IEEE 802.11-11/1490r0, Nov. 2011, pp. 1-11.

Hongyuan Zhang, "11ah Data Transmission Flow," IEEE 802.11-11/1484r1, Nov. 2011, pp. 1-15.

IEEE Standard for Information technology—Telecommunication and information exchange between systems—Local and metropolitan area networks—Specific requirements, Oct. 29, 2009, pp. 1-536, Part 11 Amendment 5, IEEE, New York, NY, USA.

Laurent Cariou, "DFT-spread OFDM optimized for 802.11ah," IEEE 802.11-11/0753r0, May 2011, pp. 1-21.

Minyoung Park, P802.11 Wireless LANs, May 2012, pp. 1-21, Intel, Hillsboro OR, USA.

* cited by examiner

OFDM TRANSMISSION METHOD AND DEVICE IN WIRELESS LAN SYSTEM

CROSS REFERENCE TO RELATED APPLICATIONS

This application is a continuation of U.S. patent application Ser. No. 15/874,827 filed Jan. 18, 2018, which is a continuation of U.S. patent application Ser. No. 15/017,035 filed Feb. 5, 2016, now U.S. Pat. No. 9,912,509, which is a continuation of U.S. patent application Ser. No. 14/408,933 filed Dec. 17, 2014, now U.S. Pat. No. 9,264,274, which is a U.S. National Stage of International Patent Application No. PCT/KR2013/005376 filed Jun. 19, 2013, which claims priority to and the benefit of Korean Patent Application Nos. 10-2012-0065520 and 10-2013-0069404 filed Jun. 19, 2012 and Jun. 18, 2013, respectively, the entire contents of which are incorporated herein by reference.

TECHNICAL FIELD

The present invention relates to a method and apparatus for orthogonal frequency division multiplexing (OFDM) transmission in a wireless local area network (WLAN) system.

BACKGROUND ART

In general, development of wireless local area network (WLAN) technology has advanced in three directions.

One direction indicates technology for improving a transmission rate and includes WLAN technology using a 60 gigahertz (GHz) band and WLAN technology using a 5 GHz band. Another direction indicates wideband WLAN technology using a frequency band under 1 GHz to extend coverage when compared to existing WLAN technology, and still another direction indicates technology for reducing link set-up time of a WLAN system.

Wideband WLAN technology may support a multi-bandwidth and adopt an orthogonal frequency division multiplexing (OFDM) transmission method. The OFDM transmission method may have an issue related to a high peak to average power ratio (PAPR).

DISCLOSURE OF INVENTION

Technical Goals

An aspect of the present invention provides an apparatus and method for reducing a peak to average power ratio (PAPR) when an orthogonal frequency division multiplexing (OFDM) modulation of a frequency repetition scheme is used in a wideband wireless local network (WLAN) system.

An aspect of the present invention provides an apparatus and method for reducing power consumption of a station in a WLAN system.

Technical Solutions

According to an aspect of the present invention, there is provided an apparatus for orthogonal frequency division multiplexing (OFDM) transmission in a wireless local area network (WLAN) system, the apparatus including a signal repetition unit to repeat an encoded signal based on a block unit and output the encoded signal and a repeated signal, an interleaver to interleave the encoded signal and the repeated signal and output an interleaved signal, a modulator to modulate the interleaved signal and output modulated symbols, and a phase rotation unit to phase shift the modulated symbols.

The phase rotation unit may maintain phase of symbols obtained by modulating the encoded signal among the modulated symbols, and phase shift symbols obtained by modulating the repeated signal among the modulated symbols.

The phase rotation unit, among the symbols obtained by modulating the repeated signal, may maintain phase of a portion of symbols and phase shift remaining symbols.

The phase rotation unit may phase shift the modulated symbols by 45 degrees (°), 90°, 135°, or 180°.

The encoded signal may include data used for a bandwidth mode having a lowest signal-to-noise ratio (SNR) among a plurality of bandwidths supported in the WLAN system.

A frame structure of the bandwidth mode having the lowest SNR may include a base frame and a duplication frame having a phase different from a phase of the base frame, and the base frame may include a short training field (STF), a long training field (LTF), and a repetition coded signal (SIG) field.

According to another aspect of the present invention, there is also provided a method for OFDM transmission in a WLAN system, the method including outputting an encoded signal and a repeated signal by repeating the encoded signal based on a block unit, outputting an interleaved signal by interleaving the encoded signal and the repeated signal, outputting modulated symbols by modulating the interleaved signal, and phase shifting the modulated symbols.

According to still another aspect of the present invention, there is also provided an apparatus for OFDM transmission in a WLAN system, the apparatus including a signal repetition unit to repeat an encoded signal based on a block unit and output the encoded signal and a repeated signal, a bit conversion unit to convert bit information associated with the repeated signal, an interleaver to interleave the encoded signal and a signal obtained by conversing the bit information and output an interleaved signal, and a modulator to modulate the interleaved signal and output modulated symbols.

According to yet another aspect of the present invention, there is also provided a method for OFDM transmission in a WLAN system, the apparatus including outputting an encoded signal and a repeated signal by repeating the encoded signal based on a block unit, conversing bit information associated with the repeated signal, outputting an interleaved signal by interleaving the encoded signal and a signal obtained by conversing the bit information, and outputting modulated symbols by modulating the interleaved signal.

Advantageous Effects

According to example embodiments, there is provided an apparatus and method for reducing a peak to average power ratio (PAPR) when an orthogonal frequency division multiplexing (OFDM) modulation of a frequency repetition scheme is used in a wideband wireless local network (WLAN) system.

Accordingly, it is possible to reduce power consumption of a station in a WLAN system.

BEST MODE FOR CARRYING OUT THE INVENTION

Figure 1:
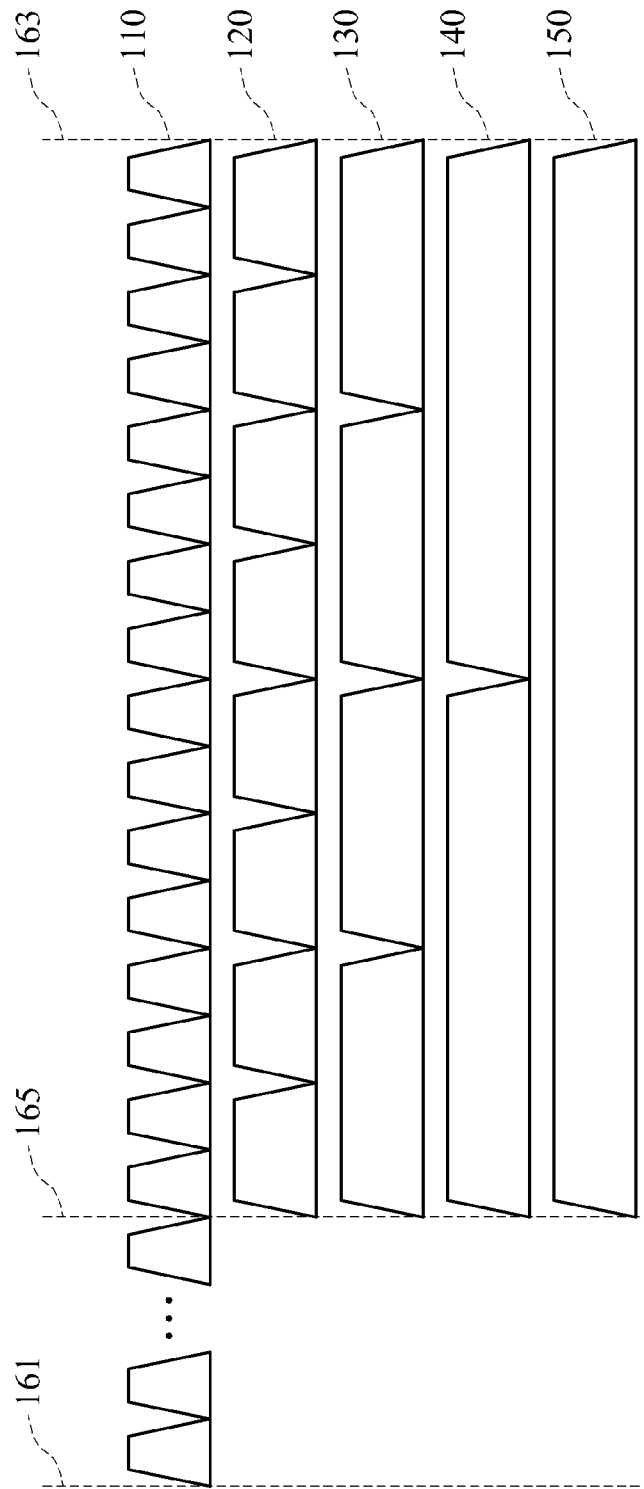
FIG. 1 illustrates a diagram describing a multi-bandwidth of a wideband wireless local area network (WLAN) system.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates a diagram describing a multi-bandwidth of a wideband wireless local area network (WLAN) system.

A wideband WLAN system, for example, a WLAN system defined in the Institute of Electrical and Electronics Engineers (IEEE) 802.11ah standard, may support a multi-bandwidth. The multi-bandwidth may include a first bandwidth having the lowest signal-to-noise ratio (SNR) and a second bandwidth that is two times greater than the first bandwidth. In this instance, a value of the first bandwidth may be 1 megahertz (MHz).

Referring to FIG. 1, the multi-bandwidth may include a 1 MHz bandwidth 110, a 2 MHz bandwidth 120, a 4 MHz bandwidth 130, an 8 MHz bandwidth 140, and a 16 MHz bandwidth 150. A frequency band of the wideband WLAN system may be less than or equal to 1 gigahertz (GHz).

Accordingly, "the multi-bandwidth may be expressed to include 1 MHz, 2 MHz, 4 MHz, 8 MHz, and 16 MHz".

In FIG. 1, a frequency lower limit value 161 may be a value between 700 MHz and 920 MHz, and a frequency upper limit value 163 may be a value between 750 MHz and 930 MHz.

As illustrated in FIG. 1, the 1 MHz bandwidth 110 may be allocated through an entire channel, and remaining bandwidths, for example, the 2 MHz bandwidth 120, the 4 MHz bandwidth 130, the 8 MHz bandwidth 140, and the 16 MHz bandwidth 150 may be allocated to only a portion of a section of the entire channel.

For example, the 16 MHz bandwidth 150 may be allocated between a predetermined frequency value 165 of FIG. 1 and the frequency upper limit value 163. Referring to FIG. 1, eight channels are allocated to the 2 MHz bandwidth 120, four channels are allocated to the 4 MHz bandwidth 130, and two channels are allocated to the 8 MHz bandwidth 140. However, an allocation of channels illustrated in FIG. 1 is an example and thus, a number of channels and a frequency band may be configured using a variety of methods.

In the present specification, a transmission mode having a value of the 1 MHz bandwidth 110 is referred to as a 1 MHz mode, and a transmission mode having a value of the 2 MHz bandwidth 120 is referred to as a 2 MHz mode.

The 1 MHz mode may refer to a transmission mode that maintains an orthogonal frequency division multiplexing (OFDM) symbol structure and includes 32 subcarriers. In this instance, the 1 MHz mode may use a frequency domain repetition transmission method and thus, may have the lowest transmission rate among bandwidths. However, in the 1 MHz mode, a signal may be transmitted to the farthest distance since the 1 MHz mode has a low SNR.

In a wideband WLAN system using a frequency band less than 1 GHz, terminals may receive a signal transmitted in the 1 MHz mode and a signal transmitted in the 2 MHz mode.

A wideband WLAN system may have a low data transmission rate and a low transmission frequency. Thus, reducing a power consumption of the wideband WLAN system for a durable use after an installation, and extending a communication range of a station (STA) or an access point (AP) are significant.

To extend a communication range of sensor devices requiring a low data transmission rate, a frequency repetition scheme may be used with respect to a binary phase-shift keying (BPSK) of the 1 MHz mode and a ½ binary convolutional code (BCC) transmission rate. However, in an OFDM transmission method, a relatively high peak to average power ratio (PAPR) may be obtained when an identical symbol is transmitted through two subcarriers. Thus, inefficiency of a power amplifier caused by the PAPR may be an issue in the OFDM transmission method. According to example embodiments of the present invention, it is possible to reduce the PAPR by shifting phase of symbol after a process of modulation.

Figure 2:
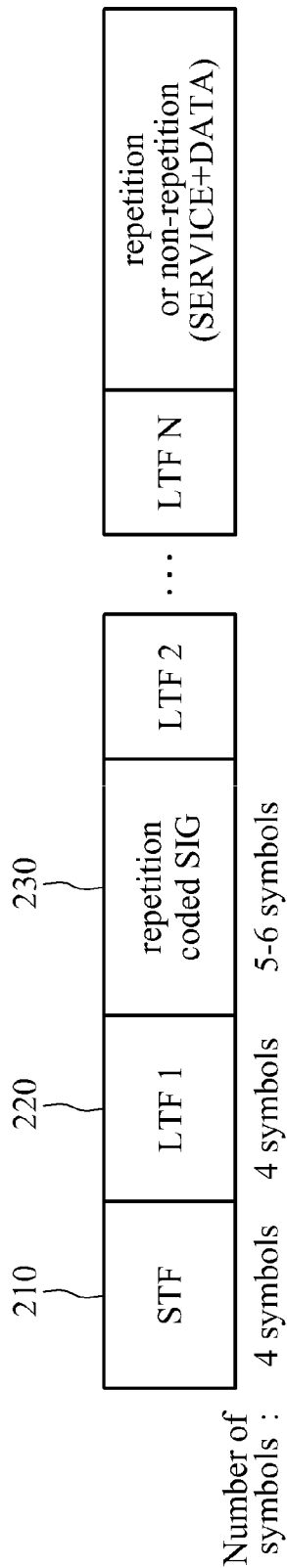
FIG. 2 illustrates a diagram describing a frame structure of a 1 megahertz (MHz) mode among a multi-bandwidth of a wideband WLAN system.

FIG. 2 illustrates a diagram describing a frame structure of a 1 MHz mode among a multi-bandwidth of a wideband WLAN system.

Referring to FIG. 2, a 1 MHz mode frame may include a short training field (STF) 210, a long training field (LTF-1) 220, and a repetition coded signal (SIG) field 230.

The STF 210 may refer to a short training field for signal detection, automatic gain control, and initial synchronization.

The LTF-1 220 may refer to a channel estimation field for accurate synchronization and SIG symbol detection.

The repetition coded SIG field 230 may be provided in a structure in which information associated with a bandwidth is omitted and includes 36-bit information.

In FIG. 2, in addition to the LTF-1 220, LFT-2 to LTF-N may be included to estimate a multiple input multiple output (MIMO) communication channel. Each length of the LFT-2 to the LTF-N may vary based on a number of transmission streams.

"Repetition or non-repetition (SERVICE+DATA)" of FIG. 2 may refer to actual data to be transmitted.

Figure 3:
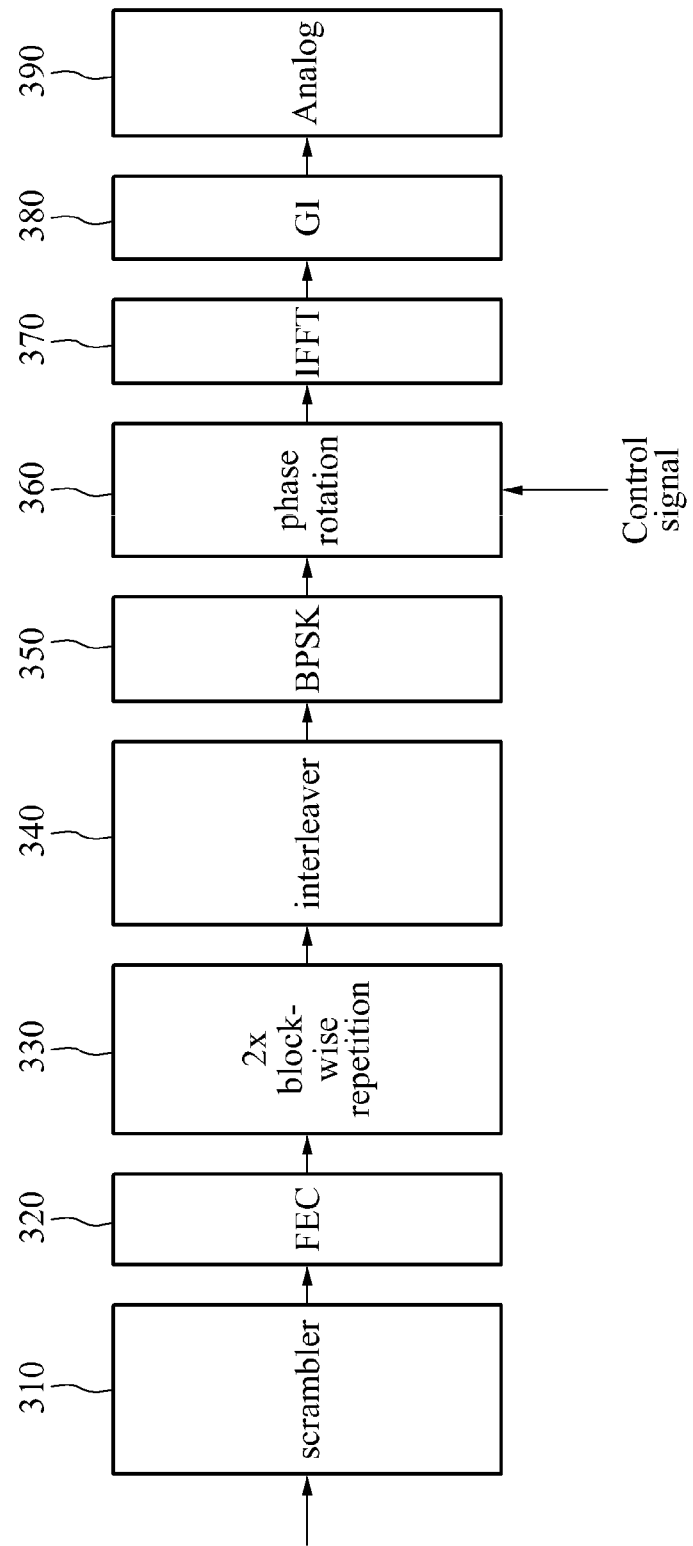
FIG. 3 illustrates a diagram describing a transmitting end structure of a WLAN system according to an embodiment of the present invention.

FIG. 3 illustrates a diagram describing a transmitting end structure of a WLAN system according to an embodiment of the present invention.

Referring to FIG. 3, a transmitting end may perform a repeated transmission in a frequency domain by BPSK modulating a 1 MHz mode frame.

A scrambler 310 may randomize data received from a media access control (MAC) layer.

A forward error correction (FEC) 320 may perform a ½ encoding for correcting a forward error.

A 2× block-wise repetition 330 may indicate a unit repeating a bit string based on a block unit inserted to a single OFDM symbol.

For example, the 2× block-wise repetition 330 may repeat an encoded bit string based on 12-bit units and output the encoded bit string+a repeated bit string.

An interleaver 340 may perform interleaving. A BPSK 350 may indicate a unit performing a BPSK modulation. An inverse fast Fourier transform (IFFT) 370 may perform 32-bit IFFT that transforms a frequency domain signal to a time domain signal.

When a guard interval is added in a guard interval (GI) 380, the time domain signal output from the IFFT 370 may be processed using an analog 390.

In this instance, output signal from the BPSK 350 may be input directly to the IFFT 370. However, when the output signal is input directly to the IFFT 370, a structure in which an identical signal is repeated twice in a single OFDM symbol may be configured. Thus, the structure in which an identical signal is repeated twice in a single OFDM may have a greater PAPR as compared to a PAPR of general OFDM signal due to characteristic correlations obtained by a signal repetition.

The characteristic correlations obtained by a signal repetition may be decreased by phase shifting.

A phase rotation 360 phase shifts an output signal from the BPSK 350 based on a predetermined rule. In this instance, the predetermined rule may be verified using a control signal.

For example, the predetermined rule may refer to a rule for phase shifting symbols obtained by BPSK modulating a repeated signal among BPSK modulated symbols.

As another example, an output signal of each block illustrated in FIG. 3 may be expressed as Table 1.

TABLE 1

| Output End | Bit String | Comment |
|---|---|---|
| FEC 320 | b1 b2 b3 b4 b5 b6 b7 b8 b9 b10 b11 b12 | 12 bits of encoded signal |
| 2× block-wise repetition 330 | b1 b2 b3 b4 b5 b6 b7 b8 b9 b10 b11 b12 b1 b2 b3 b4 b5 b6 b7 b8 b9 b10 b11 b12 | 24 bit strings Bold font: repeated signal |
| Interleaver 340 | b1 b9 b5 b2 b10 b6 b3 b11 b7 b4 b12 b8 b5 b1 b9 b6 b2 b10 b7 b3 b11 b8 b4 b12 | Varies based on structure of interleaver |
| BPSK 350 | a1 a9 a5 a2 a10 a6 a3 a11 a7 a4 a12 a8 a5 a1 a9 a6 a2 a10 a7 a3 a11 a8 a4 a12 | aN refers to a symbol obtained by BPSK modulating bn (n = 1, 2, . . . 12) Bold font: symbol obtained by BPSK modulating repeated signal |
| Phase rotation 360 | a1 a9 a5 a2 a10 a6 a3 a11 a7 a4 a12 a8 a5 a1 a9 a6 a2 a10 a7 a3 a11 a8 a4 a12 | Bold and underlined font: Q(quadrature) BPSK modulation phase shifting by 90°, and 6 symbols are QBPSK modulated among 24 bit strings |
| | a1 a9 a5 a2 a10 a6 a3 a11 a7 a4 a12 a8 a5 a1 a9 a6 a2 a10 a7 a3 a11 a8 a4 a12 | Bold and underlined font: QBPSK |

TABLE 1-continued

| Output End | Bit String | Comment |
|---|---|---|
| | | modulation shifting phase by 180°, and symbol having phase shifted by 180° indicates reversal of sign |

Referring to Table 1, 12 independent BPSK modulation signals may be transmitted through two subcarriers included in a single OFDM symbol.

Also, the phase rotation 360 may maintain phase of symbols (a1 a2 a3 a4 a5 a6 a7 a8 a9 a10 a11 a12) obtained by modulating encoded signals (b1, b2, b3, b4, b5, b6, b7, b8, b9, b10, b11, b12) and may shift phase of symbols (a1, a2, a3, a4, a5, a6, a7, a8, a9, a10, a11, a12) obtained by modulating repeated signals among the modulated symbols.

In this instance, among the symbols (a1, a2, a3, a4, a5, a6, a7, a8, a9, a10, a11, a12) obtained by modulating the repeated symbols, the phase rotation 360 may also maintain phase of a portion of symbols and shift phase of six symbols (a5, a6, a1, a2, a3).

Accordingly, when phase of a portion of symbols is maintained and remaining symbols are phase shifted among symbols obtained by modulating a repeated signal, the PAPR may be minimized.

The phase rotation 360 may phase shift modulated symbols by 45°, 90°, 135°, or 180°.

When the modulated symbols are phase shifted by 45°, 135°, or 180°, phase shifted symbols may be changed.

For example, modulated symbols are phase shifted by 180°, the phase rotation 360 may phase shift "a6 a8 a1 a10 a11 a12" with reference to Table 1. When the phase shift is 180°, the phase rotation 360 may be realized by a simple sign reversal.

In this instance, the simple sign reversal may indicate that a BPSK symbol is changed from "−1" to "1", and a BPSK symbol is changed from "1" to "−1". In particular, phase shifting by 180° may be realized by a sign reversal of "a6 a8 a1 a10 a11 a12" after a BPSK modulation. However, before the BPSK modulation, the phase shifting by 180° may also realized by converting "0" to "1", and "1" to "0" in bit information, which differs from an illustration of FIG. 3.

Accordingly, a process of the phase rotation 360 may be substituted for a bit conversion on "b1 b6 b8 b10 b1 b12" repeated in the 2× block-wise repetition 330.

Here, the bit conversion may be an exclusive OR (XOR) operation performed on the repeated bit string [b1 b2 b3 b4 b5 b6 b7 b8 b9 b10 b11 b12] and [1 0 0 0 0 1 0 1 0 1 1 1].

In addition, when phase of all symbols (a1 a9 a5 a2 a11 a6 a3 a11 a7 a4 a12 a8 a5 a1 a9 a6 a2 a10 a7 a3 a11 a8 a4 a12) is shifted, irrespective of repetition among the symbols, the PAPR may decrease.

Figure 4:
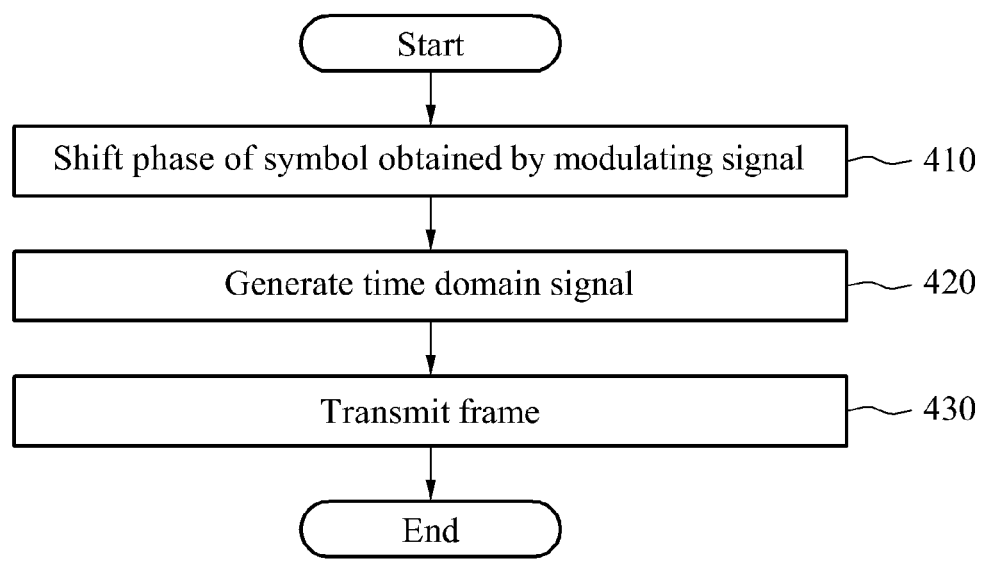
FIG. 4 illustrates a diagram describing an orthogonal frequency division multiplexing (OFDM) method of a WLAN system according to an embodiment of the present invention.

FIG. 4 illustrates a diagram describing an OFDM method for a WLAN system according to an embodiment of the present invention.

Figure 6:
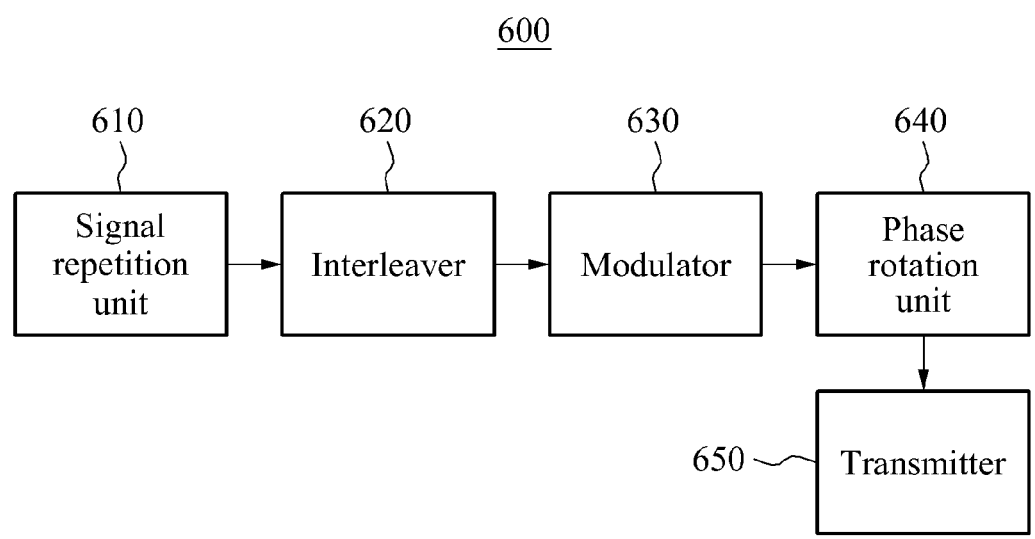
FIG. 6 illustrates a diagram describing an OFDM apparatus of a WLAN system according to an embodiment of the present invention.

The method illustrated in FIG. 4 may be performed by the transmitting end of FIG. 3 or a transmission apparatus of FIG. 6.

Before operation 410, the transmitting end may repeat an encoded signal and output the encoded signal and a repeated signal. The transmission end may interleave the encoded signal and the repeated signal and output an interleaved signal.

In operation 410, the transmission end may shift phase of modulated symbols.

In operation 420, the transmission end may generate a time domain signal from a frequency domain signal through an IFFT. In operation 430, the transmission end may transmit a frame.

Figure 5A:
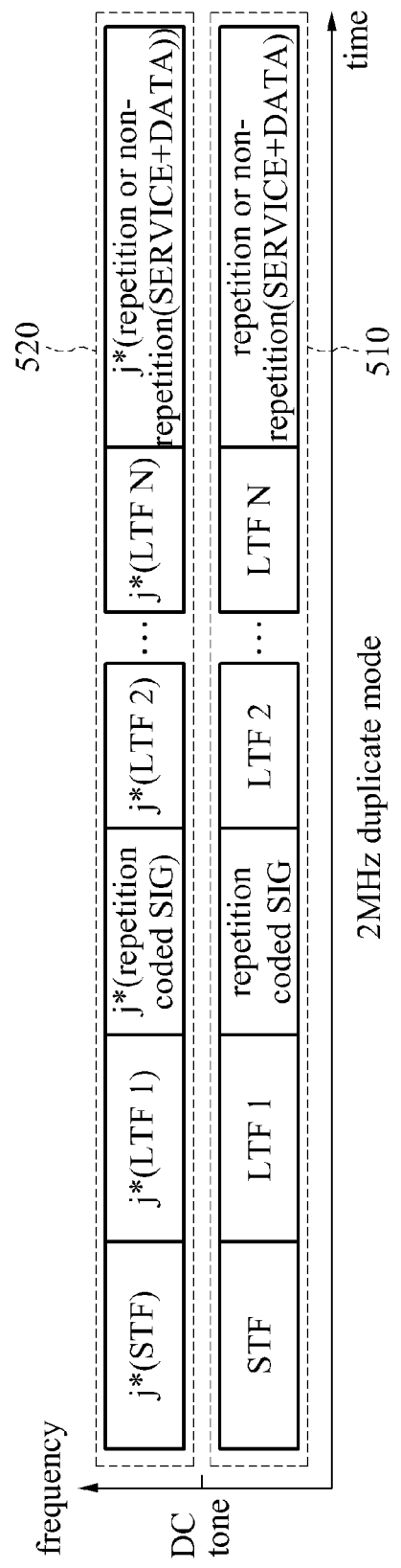
FIGS. 5A and 5B illustrate diagrams describing examples of configuring a duplication mode frame according to an embodiment of the present invention.
Figure 5B:
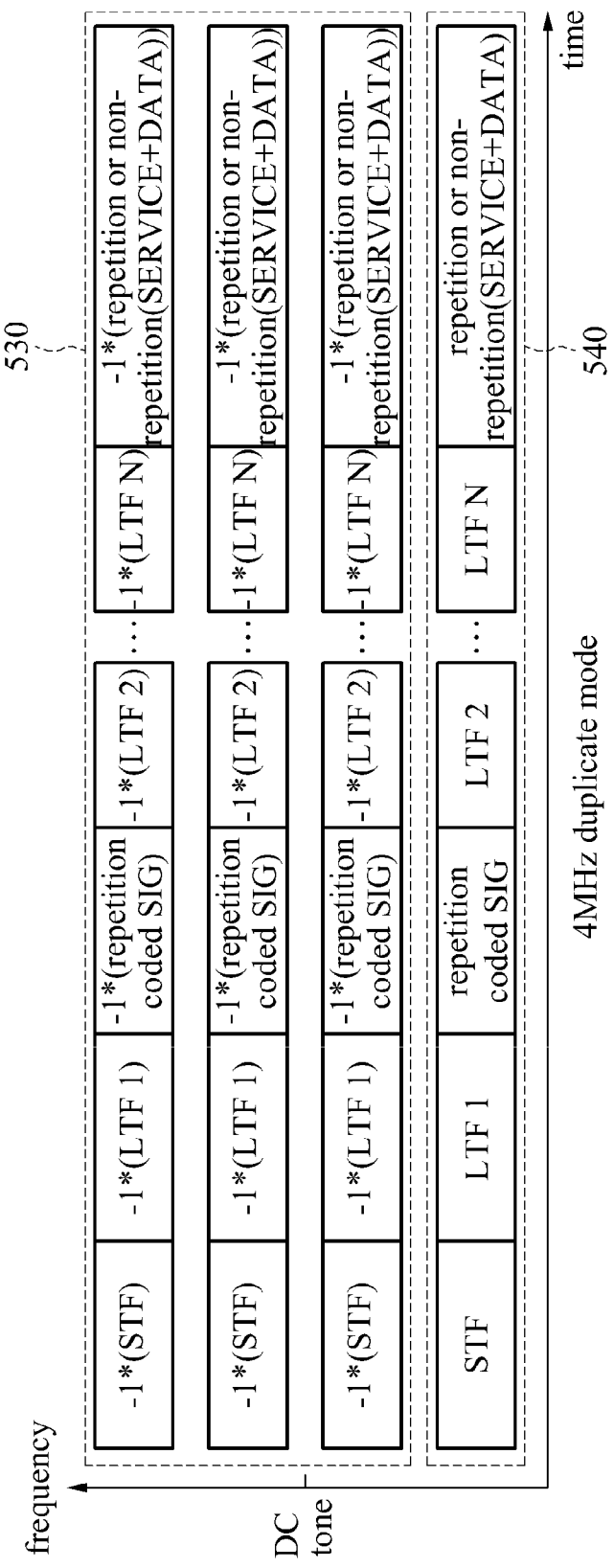

FIGS. 5A and 5B illustrate diagrams describing examples of configuring a duplication mode frame according to an embodiment of the present invention.

FIG. 5A illustrates a 2 MHz duplication mode frame.

In this instance, the 2 MHz duplication mode frame may include a base frame 510 and a duplication frame 520 having a phase different from a phase of the base frame 510 by 90 degrees (°).

Referring to FIG. 5A, a transmission of a duplication mode frame may be performed by phase shifting a frame by 90° based on a direct current (DC) tone and transmitting the frame and the phase-shifted frame, through two bands, respectively.

For example, a process of transmitting the duplication mode frame may include an operation of transmitting a base frame through a first band and simultaneously transmitting a duplication frame through a second band.

Accordingly, a reception end receiving a duplication mode frame may perform demodulation by receiving a frame received from any one of the first band and the second band.

The base frame 510 of FIG. 5 may be provided in a structure identical to that of the 1 MHz mode frame of FIG. 2. Thus, the base frame 510 may include a short training field (STF), a long training field (LTF), and an SIG field.

The SIG field of a 1 MHz mode frame may be provided in a structure in which information associated with a bandwidth is omitted, with reference to FIG. 2.

When the duplication mode frame is configured based on the 1 MHz bandwidth, inserting information for defining a bandwidth is required. For example, bandwidth information may be inserted using a portion of bits among four bits defined as a reserved bit of SIG. In this instance, the bandwidth information may refer to information associated with a bandwidth of a frequency axis used in the example of FIG. 5A. Also, the bandwidth information may be defined using a portion of lower bits of a scrambler sheet included in a service field.

Three bits may be required to divide a bandwidth into 1 MHz, 2 MHz, 4 MHz, 8 MHz, and 16 MHz and subsequently identify the divided bandwidths.

Accordingly, the 1 MHz frame structure may be provided in a structure in which information associated with a multi-bandwidth is omitted, and a base frame 510 generated based on the 1 MHz frame structure may include information associated with the multi-bandwidth in a signal field or a service field.

FIG. 5B illustrates a 4 MHz duplication mode frame.

The 4 MHz duplication mode frame may include a base frame 510 and three duplication frames having a phase different from a phase of the base frame 510 by 180°.

FIG. 6 illustrates a diagram describing an OFDM apparatus of a WLAN system according to an embodiment of the present invention.

Referring to FIG. 6, an OFDM transmission apparatus of a WLAN system according to an example embodiment includes a signal repetition unit 610, an interleaver 620, a modulator 630, a phase rotation unit 640, and a transmitter 650.

The signal repetition unit 610 may perform a function of the 2× block-wise repetition 330 of FIG. 3 identically.

The signal repetition unit 610 may repeat an encoded signal based on a block unit and output the encoded signal and a repeated signal. Here, the encoded signal may correspond to data used for a bandwidth mode having a lowest SNR among a plurality of bandwidths supported in a WLAN system.

In this instance, a frame structure of the bandwidth having the lowest SNR may include a base frame and a duplication frame having phase different from phase of the base frame, and the base frame may include an STF, an LTF, and a repetition coded SIG field.

The interleaver 620 may perform a function of the interleaver 340 of FIG. 3 identically.

The interleaver may interleave the encoded signal and the repeated signal and output an interleaved signal.

The modulator 630 may perform a function of the BPSK 350 of FIG. 3 identically.

The modulator 630 may modulate the interleaved signal and output modulated symbols.

The phase rotation unit 640 may perform a function of the phase rotation 360 of FIG. 3 identically.

The phase rotation unit 640 may phase shift the modulated symbols.

The phase rotation unit 640 may maintain phase of symbols obtained by modulating encoded signals among the modulated symbols, and phase shift symbols obtained by modulating repeated signals among the modulated symbols.

Among the symbols obtained by modulating the repeated symbols, the phase rotation unit 640 may maintain phase of a portion of symbols and phase shift remaining symbols.

The phase rotation unit 640 may phase shift modulated symbols by 45°, 90°, 135°, or 180°.

The transmitter 650 may include the IFFT 370, the GI 380, and the analog 390 of FIG. 3. The transmitter 650 may transmit a 1 MHz mode frame or transmit the duplication mode frame of FIG. 5. Thus, the transmitter 650 may transmit the base frame 510 of FIG. 5 through a first bandwidth, and simultaneously transmit the duplication mode frame 520 of FIG. 5 through a second bandwidth.

Figure 7:
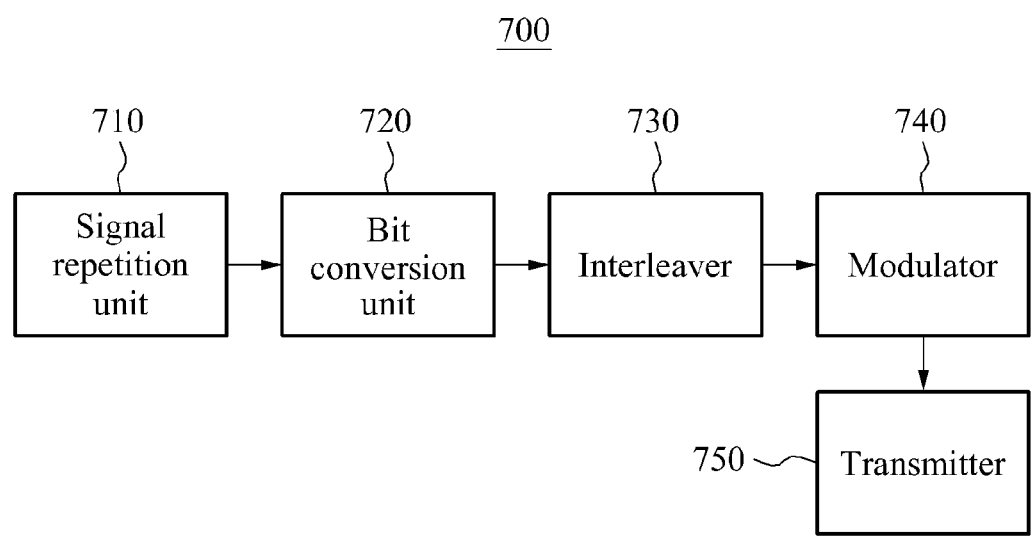
FIG. 7 illustrates a diagram describing an OFDM apparatus of a WLAN system according to another embodiment of the present invention.

FIG. 7 illustrates a diagram describing an OFDM apparatus of a WLAN system according to another embodiment of the present invention.

Referring to FIG. 7, an OFDM transmission apparatus 700 of a WLAN system according to an example embodiment may include a signal repetition unit 710, a bit conversion unit 720, an interleaver 730, a modulator 730, and a transmitter 750.

The signal repetition unit 710 may perform a function of the 2× block-wise repetition 330 of FIG. 3 identically.

The signal repetition unit 710 may repeat an encoded signal based on a block unit and output the encoded signal and a repeated signal. Here, the encoded signal may correspond to data used for a bandwidth mode having the lowest SNR among a plurality of bandwidths supported in a WLAN system.

The bit conversion unit 720 may perform a conversion on bit information of the repeated signal. A bit conversion may be performing an XOR operation, as described with reference to FIG. 3.

Among bit information of the repeated signal, the bit conversion unit 720 may maintain signs of a portion of bits, and change signs of remaining bits.

For example, the bit conversion unit 720 may perform the XOR operation on the repeated bit string [b1 b2 b3 b4 b5 b6 b7 b8 b9 b10 b11 b12] and [1 0 0 0 0 1 0 1 0 1 1 1].

The interleaver 730 may perform a function of the interleaver 340 of FIG. 3 identically.

The interleaver 730 may interleave the encoded signal and a signal obtained by a conversion of the bit information, and output an interleaved signal.

The modulator 730 may perform a function of the BPSK 350 of FIG. 3 identically.

The modulator 730 may modulate the interleaved signal and output modulated symbols.

The transmitter 750 may include the IFFT 370, the GI 380, and the analog 390 of FIG. 3. The transmitter may transmit a 1 MHz mode frame, or transmit the duplication mode frame of FIG. 5. Thus, the transmitter 750 may transmit the base frame 510 of FIG. 5 through a first bandwidth, and simultaneously transmit the duplication mode frame 520 through a second bandwidth.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A communication method by a communication apparatus in a wireless local area network (WLAN) system, the method comprising:
generating a first coded signal;
generating a second coded signal based on a bit conversion, wherein the second coded signal is generated by repeating the first coded signal in block unit and converting bit information of the repeated first coded signal; and
transmitting a signal generated based on the first coded signal and the second coded signal,
wherein the second coded signal is generated by converting a first part of bits of the repeated first coded signal based on the bit conversion,
wherein same information is mapped to a first part of frequency subcarriers and a second part of the frequency subcarriers based on the first coded signal and the second coded signal,
wherein the bit conversion is performed based on an XOR operation using a predetermined bit sequence for conversion, and
wherein a bit represented by 0 among the first part of bits is converted to 1, and a bit represented by 1 among the first part of bits is converted to 1.

2. The method of claim 1,
wherein the first coded signal comprises 12 bits included in an OFDM (Orthogonal Frequency Division Multiplexing) symbol.

3. The method of claim 1,
wherein the second coded signal is generated based on an XOR operation using 12 bits comprised in the repeated first coded signal and [1 0 0 0 0 1 0 1 0 1 1 1].

4. The method of claim 1, further comprising:
interleaving the first coded signal and the second coded signal to output an interleaved signal;
modulating the interleaved signal of the first coded signal and the second coded signal to output a modulated signal; and
generating the signal based on the modulated signal.

5. A communication apparatus in a wireless local area network (WLAN) system, the apparatus comprising:
a processor; and
a transmitter,
wherein the processor is configured to:
generate a first coded signal,
generate a second coded signal based on a bit conversion, wherein the second coded signal is generated by repeating the first coded signal in block unit and converting bit information of the repeated first coded signal, and
transmit a signal generated based on the first coded signal and the second coded signal,
wherein the second coded signal is generated by converting a first part of bits of the repeated first coded signal based on the bit conversion,
wherein same information is mapped to a first part of frequency subcarriers and a second part of the frequency subcarriers based on the first coded signal and the second coded signal,
wherein the bit conversion is performed based on an XOR operation using a predetermined bit sequence for conversion, and
wherein a bit represented by 0 among the first part of bits is converted to 1, and a bit represented by 1 among the first part of bits is converted to 1.

6. The apparatus of claim 5,
wherein the first coded signal comprises 12 bits included in an OFDM (Orthogonal Frequency Division Multiplexing) symbol.

7. The apparatus of claim 5,
wherein the second coded signal is generated based on an XOR operation using 12 bits comprised in the repeated first coded signal and [1 0 0 0 0 1 0 1 0 1 1 1].

8. The apparatus of claim 5, further comprising:
interleaving the first coded signal and the second coded signal to output an interleaved signal;
modulating the interleaved signal of the first coded signal and the second coded signal to output a modulated signal; and
generating the signal based on the modulated signal.

* * * * *